United States Patent
Saeki et al.

(10) Patent No.: US 8,816,643 B2
(45) Date of Patent: Aug. 26, 2014

(54) RECHARGEABLE DEVICE AND POWER FEEDING CONTROL METHOD

(75) Inventors: Takeshi Saeki, Osaka (JP); Yoichi Hirata, Osaka (JP); Takanori Yamamoto, Nara (JP)

(73) Assignee: Panasonic Corporation, Kadoma-shi (JP)

( * ) Notice: Subject to any disclaimer, the term of this patent is extended or adjusted under 35 U.S.C. 154(b) by 753 days.

(21) Appl. No.: 12/978,658

(22) Filed: Dec. 27, 2010

(65) Prior Publication Data

US 2011/0156659 A1 Jun. 30, 2011

(30) Foreign Application Priority Data

Dec. 28, 2009 (JP) ................................ 2009-297397

(51) Int. Cl.
*H02J 7/00* (2006.01)
*H02J 7/14* (2006.01)

(52) U.S. Cl.
CPC ...................................... *H02J 7/00* (2013.01)
USPC ........... 320/138; 320/103; 320/111; 320/114; 320/128

(58) Field of Classification Search
USPC ......... 320/138, 137, 136, 134, 133, 103, 128; 307/43
See application file for complete search history.

(56) References Cited

U.S. PATENT DOCUMENTS

| | | | | |
|---|---|---|---|---|
| 5,357,185 A * | 10/1994 | Chen | ............................. | 320/110 |
| 6,465,987 B1 * | 10/2002 | Haas et al. | .................... | 320/128 |
| 6,633,932 B1 * | 10/2003 | Bork et al. | ...................... | 710/72 |
| 6,774,604 B2 * | 8/2004 | Matsuda et al. | .............. | 320/110 |
| 6,798,173 B2 * | 9/2004 | Hsu | ................................ | 320/134 |
| 8,044,639 B2 * | 10/2011 | Tamegai et al. | ............... | 320/138 |
| 8,103,886 B2 * | 1/2012 | Irie | ................................ | 713/310 |
| 2002/0079864 A1 * | 6/2002 | Soumi et al. | .................. | 320/115 |
| 2005/0134689 A1 * | 6/2005 | Hatanaka | .................... | 348/207.1 |
| 2009/0174366 A1 * | 7/2009 | Ahmad et al. | ................ | 320/114 |
| 2009/0212741 A1 * | 8/2009 | Ferguson | ....................... | 320/134 |
| 2010/0060239 A1 * | 3/2010 | Lundqvist et al. | ............ | 320/138 |
| 2010/0164440 A1 * | 7/2010 | Ikeda | ............................ | 320/162 |
| 2010/0315042 A1 * | 12/2010 | Wei | .............................. | 320/134 |

FOREIGN PATENT DOCUMENTS

JP 2006-352255 A 12/2006
WO WO-2008-044297 A1 4/2008

* cited by examiner

*Primary Examiner* — Edward Tso
*Assistant Examiner* — Alexis Boateng
(74) *Attorney, Agent, or Firm* — James Judge (57) ABSTRACT

Provided is an electronic device which is selectively connectable to two or more power sources thereby to charge the battery therein, and when connection with one power source is discontinued, the electronic device promptly switches connection to another power source thereby to start battery charging. When the external device connection section 290 becomes connected to an external device, while an AC connection section 300 is connected to an AC power source, a control section 210 performs initial communication with the external device thereby to perform charge setting necessary for charging a battery 310 via the external device.

4 Claims, 6 Drawing Sheets

RECHARGEABLE DEVICE AND POWER FEEDING CONTROL METHOD

BACKGROUND OF THE INVENTION

1. Field of the Invention

The present invention relates to a power feeding technique used in an electronic device which is selectively connected to two or more power sources thereby to charge batteries in the device.

2. Description of the Background Art

Japanese Laid-Open Patent Publication No. 2006-352255 (Patent Literature 1) discloses a digital camera which has a function of determining, in accordance with a command received from its computer, whether to be connected to and charged from an external power source, or to be connected to and charged from a USB bus. The computer disclosed in Patent Literature 1 issues to the digital camera a command for switching the power source, upon reception of mode setting performed by the user.

Accordingly, it is possible to offer an image input system which enables image data transmission and remote photographing without bothering the user about the battery capacity or its connection with the AC adapter.

SUMMARY OF THE INVENTION

An objective of the present invention is to provide an electronic device which is connected to two or more power sources thereby to charge the battery therein, and which when one of the power sources that feeds power to the electronic device has been disconnected, promptly establishes connection with another one of the power sources thereby to start charging the battery.

The present invention relates to a rechargeable device selectively suppliable with operating power from an AC power source and from a power-supplying capable external electronic device. The rechargeable device according to the present invention is simultaneously connectable to both the AC power source and the external electronic device, and comprises: a battery; an AC connection section connectable to the AC power source; an external electronic device connection section intercommunicably connectable to the external electronic device, for being fed with current from the external electronic device; and a control section for charging the battery by means of the AC power source while current is being supplied from the AC power source to the AC connection section, and for charging the battery using power from the external electronic device when current is not being supplied from the AC power source to the AC connection section and a predetermined level of current is suppliable from the external electronic device to the external electronic device connection section. If the external electronic device connection section becomes connected to the external electronic device while the battery is being charged by means of the AC power source, the control section performs initial communication with the external electronic device to determine whether current of at least a predetermined value can be supplied to the external electronic device connection section from the external electronic device, and if the predetermined value of current can be supplied to the external electronic device connection section, the control section performs a charge-setting routine necessary to enable the battery to be charged from the external electronic device.

Further, the present invention relates to a method for controlling power feeding to a rechargeable device having mounted therein a battery simultaneously connectable to both an AC power source and a power-supplying capable external electronic device, the rechargeable device being intercommunicably connectable to the external electronic device, for being fed with current from the external electronic device. According to the method for controlling power feeding, the battery is charged by means of the AC power source while current is being supplied from the AC power source to the rechargeable device; the battery is charged by using power from the external electronic device if current is not being supplied from the AC power source to the rechargeable device yet current is being supplied from the external electronic device to the rechargeable device; and the electronic device performs initial communication with the external electronic device if the rechargeable device becomes connected to the external electronic device while the battery is being charged by means of the AC power source, to determine whether current of at least a predetermined value can be supplied to the rechargeable device from the external electronic device, and if the predetermined value of current can be supplied to rechargeable device, and performs a charge-setting routine necessary to enable the battery to be charged from the external electronic device.

Further, the present invention relates to a power feeding control program provided in and executed by a rechargeable device having mounted therein a battery simultaneously connectable to both an AC power source and a power-supplying capable external electronic device and which is intercommunicably connectable to the external electronic device and can be fed with current from the external electronic device. The power feeding control program causes the electronic device to charge the battery by means of the AC power source while current is being supplied from the AC power source to the rechargeable device; and to charge the battery using power from the external electronic device if current is not being supplied from the AC power source to the rechargeable device yet current is being supplied from the external electronic device to the rechargeable device. The electronic device performs initial communication with the external electronic device if the rechargeable device becomes connected to the external electronic device while the battery is being charged by means of the AC power source, to determine whether current of at least a predetermined value can be supplied to the rechargeable device from the external electronic device, and if the predetermined value of current can be supplied to rechargeable device, performing a charge-setting routine necessary to enable the battery to be charged from the external electronic device.

The electronic device according to the present invention performs charge setting for charging the battery from an external device, when the electronic device becomes ready to charge the battery from the external device, even if it is connected to the AC adapter. As a result, if the power source that currently supplies power to the electronic device has been disconnected, the electronic device of the present invention can promptly establish connection with another power source thereby to start battery charging therefrom.

DESCRIPTION OF THE PREFERRED EMBODIMENTS (First Embodiment)

Figure 1:
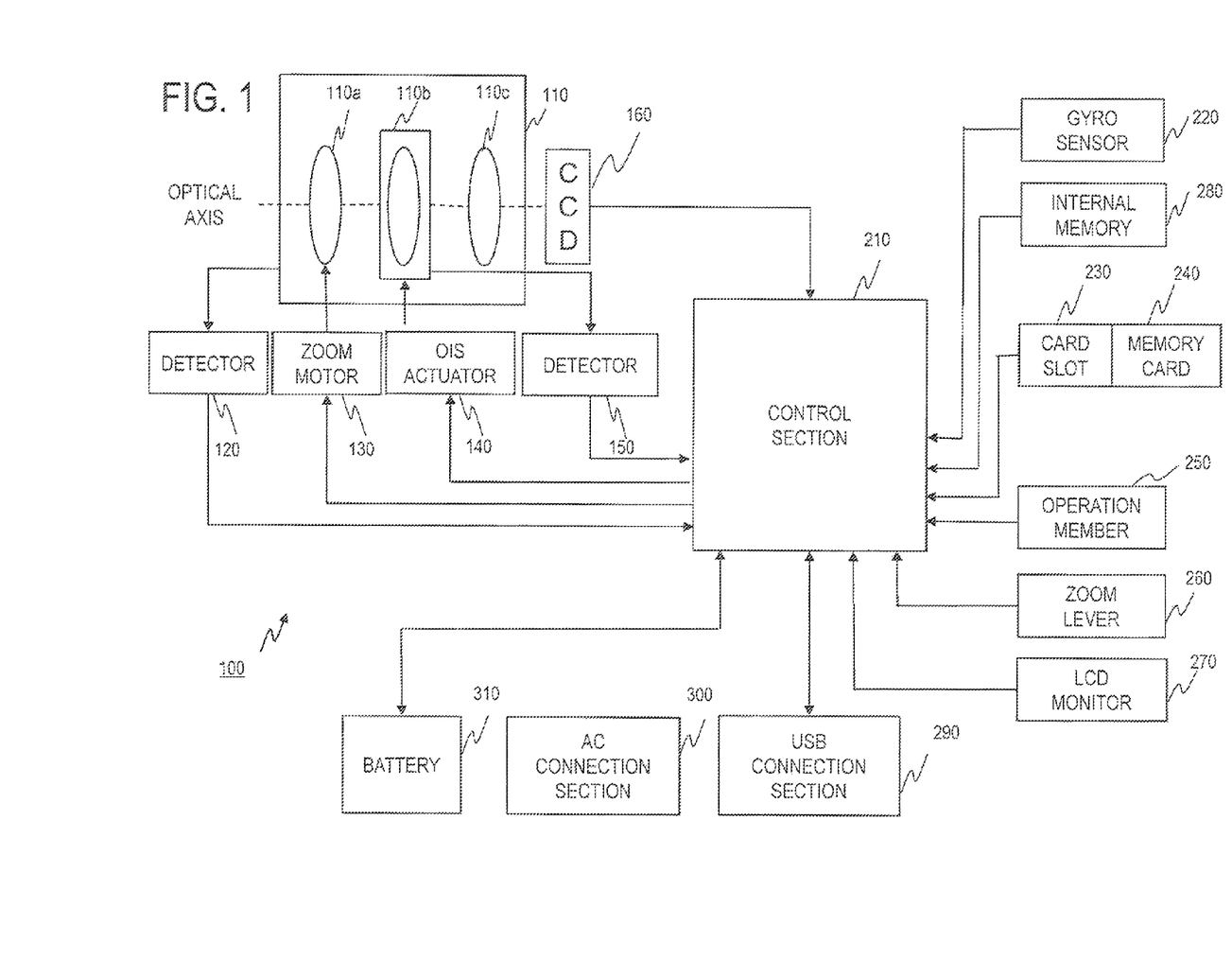
FIG. 1 is a block diagram illustrating a configuration of a digital camera.

With reference to the drawings, a configuration of a digital video camera according to an embodiment of the present invention will be described. FIG. 1 is a block diagram illustrating a configuration of a digital video camera 100 according to this embodiment. The digital video camera 100 captures an object image formed by an imaging optical system 110 by means of a Charge Coupled Device (CCD) image sensor 160. Image data generated by means of the CCD image sensor 160 is subjected to various processes by an image processing section 170, and thereby stored into a memory card 240. Further, the image data stored into the memory card 240 can be displayed on a liquid crystal display (LCD) monitor 270. Hereinafter, the configuration of the digital video camera 100 will be described in detail.

The imaging optical system 110 of the digital video camera 100 includes at least one lens 110a, an Optical Image Stabilizer (OIS) 110b, and a focus lens 110c. The lens 110a moves along the optical axis in accordance with the user's operation of upscaling or downscaling an object image. The OIS 110b includes thereinside a correcting lens that moves perpendicularly to the optical axis, and reduces blurring of the object image by driving the correcting lens in a direction to compensate fluctuation of the digital video camera 100. The focus lens 110c moves along the optical axis of the optical system thereby to focus on the object image. It should be noted that the imaging optical system 110 may include a spectrum prism.

A zoom motor 130 drives the lens 110a to move along the optical axis for zooming. The zoom motor 130 may drive the lens 110a via such a mechanism as a cam mechanism or ball screw. The detector 120 detects the location of the lens 110a along the optical axis. In accordance with the movement of the lens 110a along the optical axis, the detector 120 outputs signals indicating the location of the lens 110a by means of a switch such as a brush.

An OIS actuator 140 drives the correcting lens 110c in the OIS 110b to move in a plane perpendicular to the optical axis. The OIS actuator 140 can be realized with a plane coil or an ultrasonic motor. A detector 150 detects an amount of movement of the correcting lens 110c in the OIS 110b.

The CCD image sensor 160 captures the object image formed by the imaging optical system 110 thereby to generate image data. The CCD image sensor 160 performs various operations such as exposure, transfer, and electronic shutter operation.

A gyro sensor 220 obtains angular velocity information based on hand movement of the user in order to compensate the hand movement. The gyro sensor 220 transmits the angular velocity information to the OIS actuator 140, and based on the angular velocity information, the OIS actuator 140 drives the correcting lens 110c in the OIS to move in a direction to compensate the hand movement.

An internal memory 280 stores therein a control program and the like, so as to control the whole digital video camera 100. As the internal memory 280, a flash memory, a ferroelectric random-access memory, or the like is used.

A card slot 230 is mechanically and electrically connectable to the memory card 240. The memory card 240 includes thereinside a flash memory, a ferroelectric random-access memory, or the like, and stores therein data.

An operation member 250 is a member that allows the user to input instructions for capturing images. A zoom lever 260 is a member that allows the user to input instructions for changing zoom magnifying power.

The LCD monitor 270 displays thereon images that are obtained by the image processing section 170 processing the image data generated by the CCD image sensor 160, and/or images that are based on image data read from the memory card 240.

A USB connection section 290 is an interface that allows connection of the digital video camera 100 with an external device such as a personal computer. In addition, it can receive power from an external device, and receive data of an external device.

An Alternating Current (AC) connection section 300 is an interface that allows connection of the digital video camera 100 with an AC power source. The digital video camera 100 can receive power from the AC power source via the AC connection section 300.

A battery 310 supplies power to the digital video camera 100. For the digital video camera, a lithium ion battery is typically used as the battery 310. However, the battery 310 is not necessarily the lithium ion battery, and instead, a nickel-hydrogen battery, a nickel cadmium battery, or the like may also be used.

A control section 210 is connected to the above-described components and sections thereby to control the whole digital video camera 100. Hereinafter, an internal configuration of the control section 210 will be described in detail.

Figure 2:
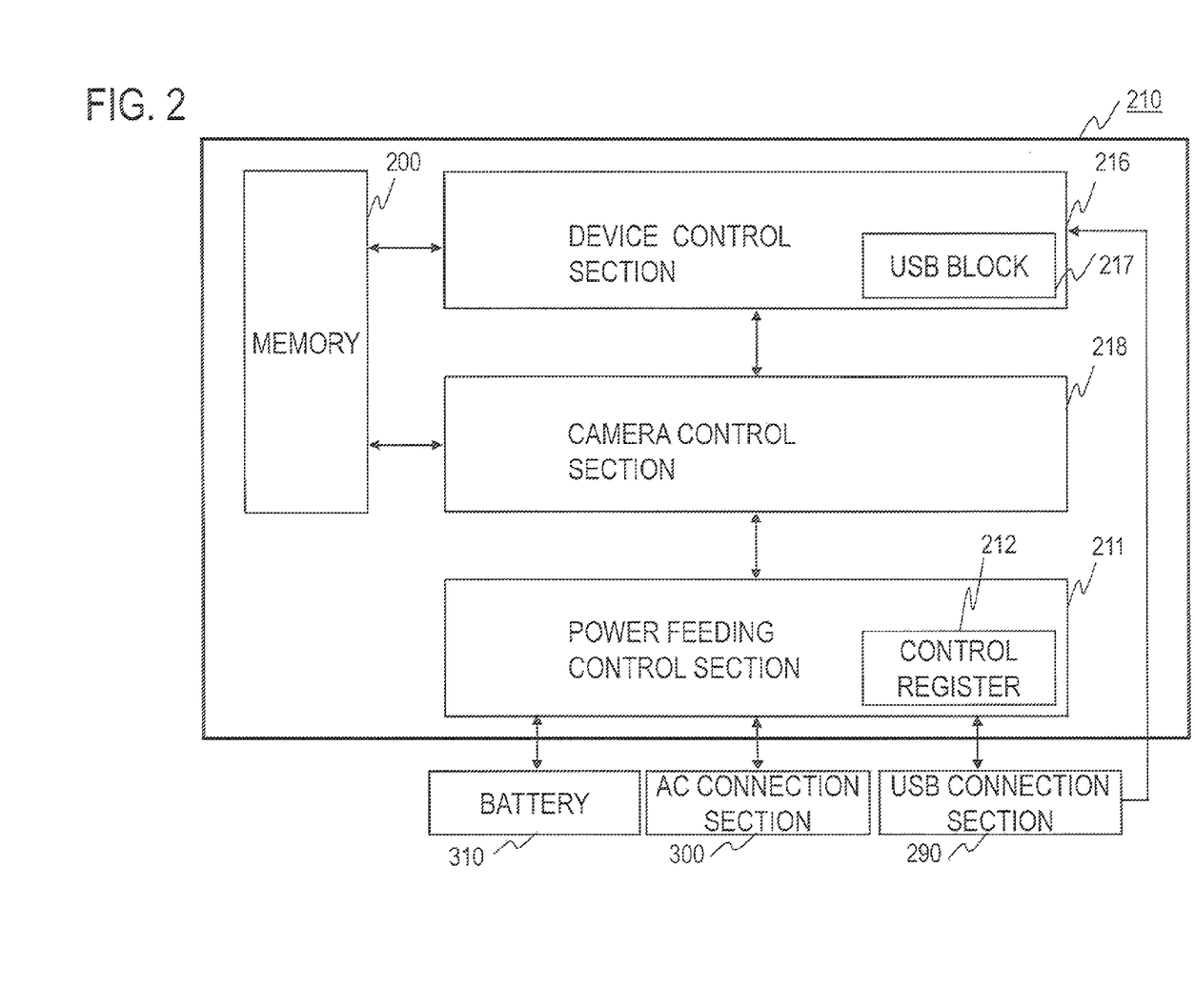
FIG. 2 shows an internal configuration of a control section according to an embodiment of the present invention.

FIG. 2 illustrates the internal configuration of the control section 210. The control section 210 includes a power feeding control section 211, a camera control section 218, a device control section 216, and a memory 200.

The power feeding control section 211 is connected to the USB connection section 290, the AC connection section 300, and the battery 310. The power feeding control section 211 detects connection/disconnection between the USB connection section 290 and an external device, connection/disconnection between the AC connection section 300 and the AC power source, and the remaining battery level. The power feeding control section 211 includes a control register 212. The control register 212 at least holds information indicating whether the battery 310 is chargeable using the power from an external device connected via the USB connection section 290. The information held by the control register 212 is set by the camera control section 218. The power feeding control section 211 is constantly ON as long as current is supplied to the AC connection section 300 or USB connection section 290, even if the digital video camera 100 is powered off, and the power feeding control section 211 controls charging of the battery 310. More specifically, in the case where current is supplied to the AC connection section 300, the power feeding control section 211 charges the battery 310 by means of the AC power source connected via the AC connection section 300. On the other hand, in the case where current is supplied to the USB connection section 290 only, if the information held by the control register 212 indicates that the battery 310 is chargeable from the USB connection section 290, the power feeding control section 211 charges the battery 310 using the power from the external device connected via the USB connection section 290. The feeding control performed by the power feeding control section 211 will be described later further in detail. In this embodiment, the control register 212 is included in the power feeding control section 211. However, in place of the control register 212, a memory provided inside or outside the power feeding control section 211 may be used for storing the above-described information.

The camera control section 218 performs control processes necessary for the camera function. As the control processes, the camera control section 218 controls, for example: the imaging optical system such as zooming, focusing, and optical image blurring compensation; and driving of the image sensor. The camera control section 218 is basically OFF when the digital video camera 100 is powered off, but is ON while charge setting is performed, which is to be described later. When the digital video camera 100 is powered off, the camera control section 218 determines, based on the current value suppliable via the USB connection section 290, whether the battery is chargeable using the power from the external device, and sets the value of the control register 212. The camera control section 218 may refer to the remaining battery level for determining whether the battery is chargeable using the power from the external device.

The device control section 216 performs control processes, excluding the control processes performed by the power feeding control section 211 and the control processes performed by the camera control section 218. The device control section 216 performs processes such as image processing of image data outputted from the image sensor; compression, extension, and encoding of image data; format conversion; data storing into a memory card; display of images on the LCD monitor; intercommunication with an external device via the USB connection section 290; and control of GUI displayed on the LCD monitor. The device control section 216 includes a USB block. The USB block 217 performs USB communication with an external device via the USB connection section 290. Further, with this communication, the USB block 217 obtains information on the power feeding capacity of the external device. Still further, if the digital video camera 100 is powered on, the camera control section 218 determines whether the digital video camera 100 can operate Mass Storage function, based on the current value supplied to the USB connection section 290 and on the remaining battery level. Here, the Mass Storage function means that the digital video camera 100 operates in a state where the digital video camera 100 allows the external device connected via the external device connection section 290 to access and to refer to the storage medium in the digital video camera 100.

The memory 200 is a work memory of the device control section 216 and the camera control section 218. As the memory 200, for example, a Dynamic Random Access Memory (DRAM), a ferroelectric random-access memory, or the like is used.

The control section 210 may be realized with hardware only, or may be realized with a combination of hardware and software. For example, as the control section 210, a semiconductor device, an integrated circuit, a microcomputer, or the like is used. If the control section 210 is realized with hardware, the device control section 216, the camera control section 218, and the power feeding control section 211 may be configured integrally as a unit of hardware, or may be configured individually as respective units of hardware. The device control section 216 may be configured with a DSP for image processing. On the other hand, if a power feeding control process to be described later is realized with software, the control section 210 may be configured with a processor and memory, and a power feeding control program loaded into the memory may be executed by the processor. The power feeding control program can be provided in a state of being stored in a storage medium such as a flash memory, optical disc, or the like.

Figure 3:
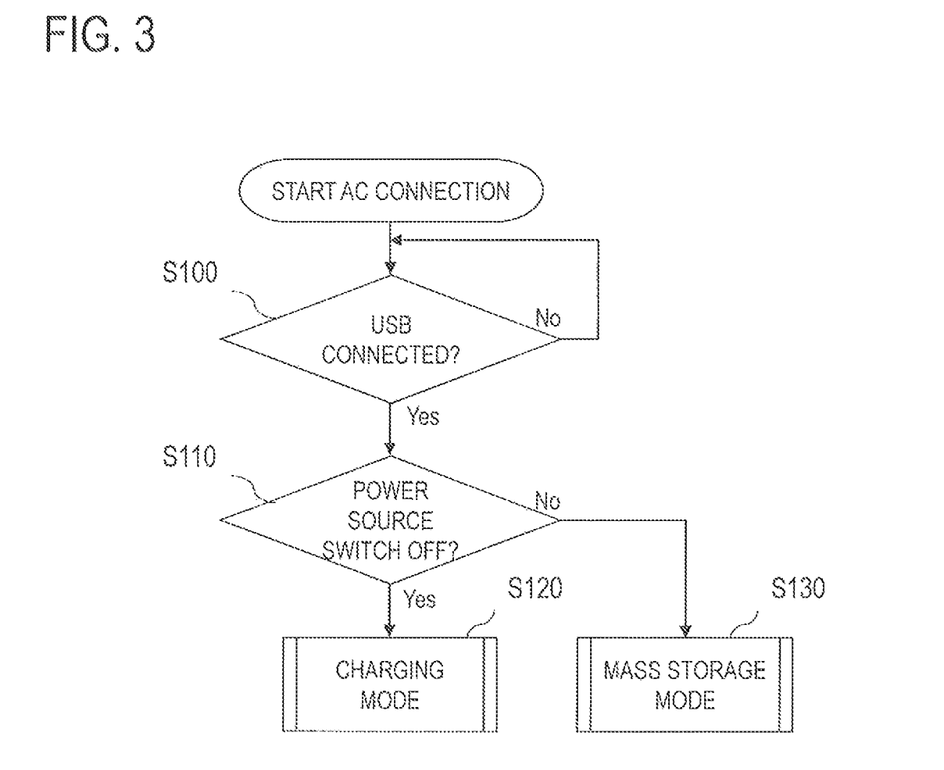
FIG. 3 is a flowchart showing control performed by the control section upon connection establishment with a USB.

FIG. 3 is a flowchart showing control performed by the control section during USB connection.

While the AC connection section 300 is connected to the AC power source and supplied with current therefrom, the power feeding control section 211 charges the battery 310 by means of the AC power source. While current is supplied to the AC connection section 300, the control section 210 determines whether the USB connection section 290 is connected to an external device (S100). The determination in S100 is made by the power feeding control section 211 detecting a change in voltage applied to the USB connection section 290. The control section 210 advances the processing to S110 when the USB connection section 290 is connected to an external device. Otherwise (No in S100), the control section 210 waits until the USB connection section 290 becomes connected to an external device.

When the USB connection section 290 becomes connected to an external device (Yes in S100), the control section 210 determines whether the power source switch is OFF. If the power source switch is OFF (Yes in S110), the control section 210 performs a process for a charging mode (S120), whereas if the power source switch is ON, the control section 210 performs a process for a Mass Storage mode (S130).

Figure 4A:
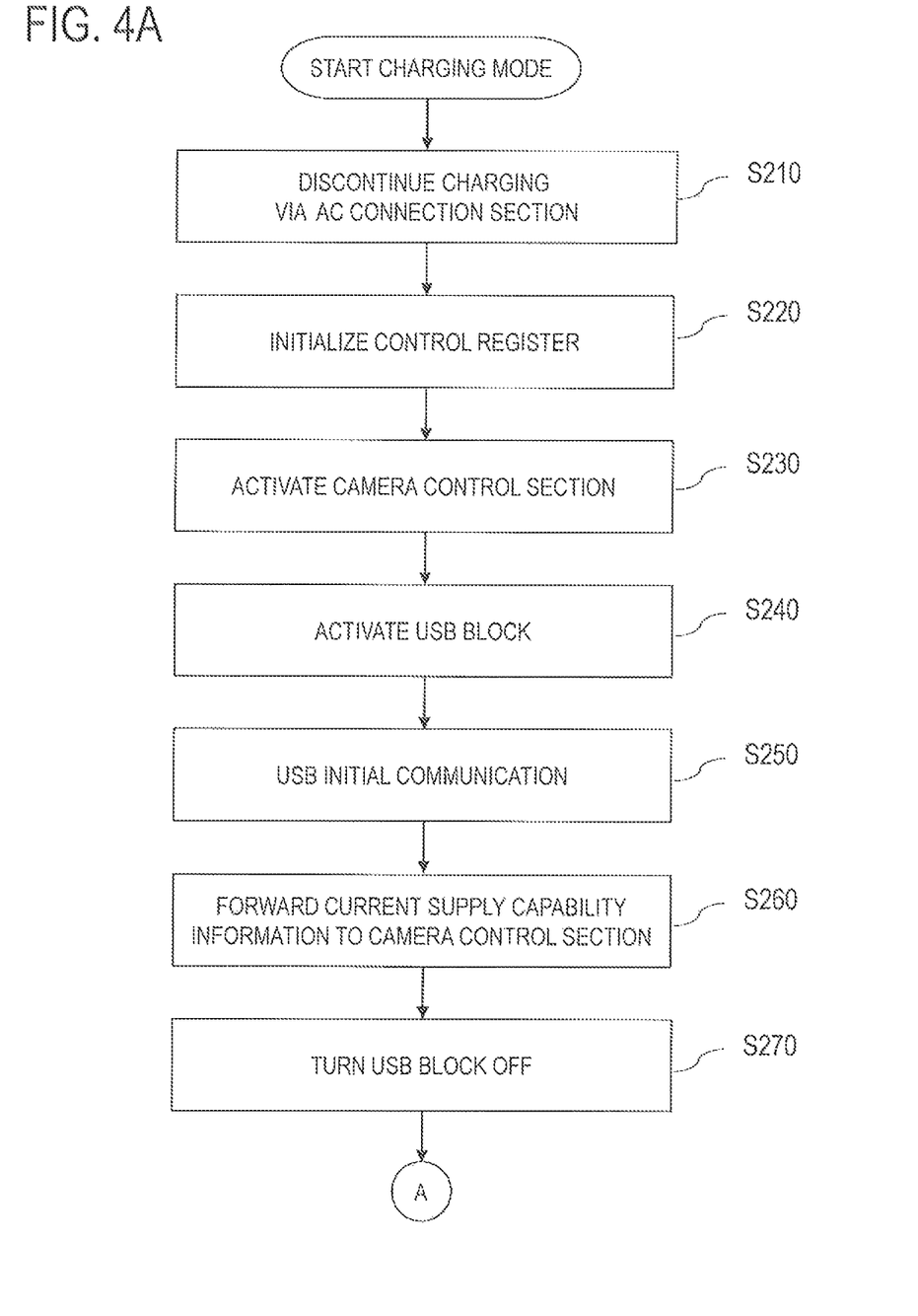
FIG. 4A is a flowchart showing a part of a power feeding control method according to an embodiment of present invention.
Figure 4B:
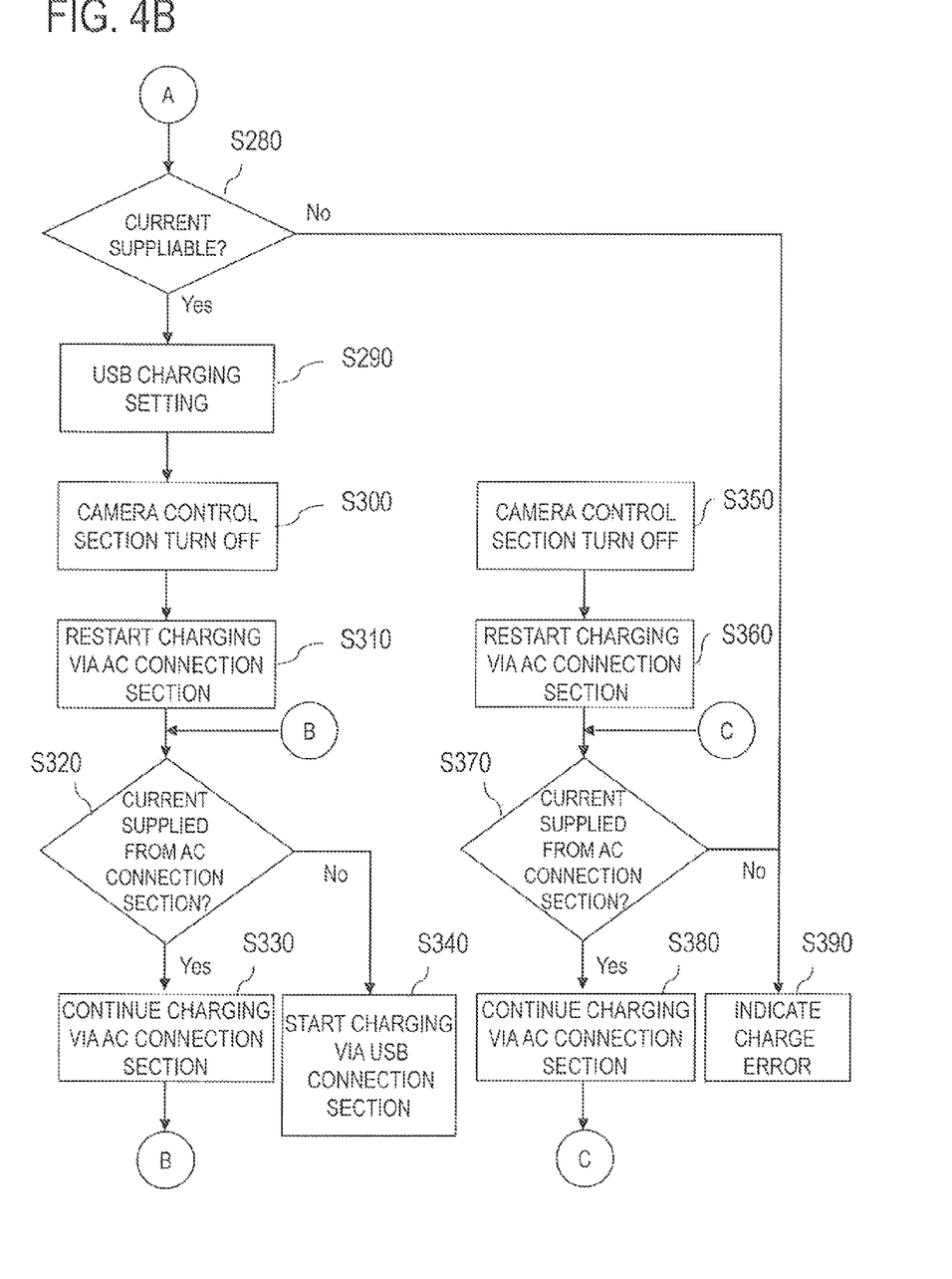
FIG. 4B is a flowchart showing the subsequent part of the power feeding control method shown in FIG. 4A.

FIG. 4A is a flowchart showing a part of a power feeding control method according to this embodiment, and FIG. 4B is a flowchart showing the subsequent part of the power feeding control method shown in FIG. 4A.

When the charging mode (S120 in FIG. 3) starts, the power feeding control section 211 discontinues battery charge by means of the AC power source via the AC connection section 300 (S210). After the discontinuation of battery charge, the power feeding control section 211 initializes the control register 212 (S220). After the initialization of the control register 212, the power feeding control section 211 activates the camera control section 218 (S230). When activated by the power feeding control section 211, the camera control section 218 activates the USB block 217, which is included in the device control section 216 and which is necessary for USB communication with an external device via the USB connection section 290 (S240).

When activated by the camera control section 218, the USB block 217 starts USB initial communication with an external device via the USB connection section 290 (S250). The USB initial communication is performed when the digital video camera 100 is connected to an external device such as a personal computer. Specifically, during the USB initial communication, the USB block 217 notifies the external device, such as a personal computer, of functions or features of the digital video camera 100, or checks whether the external device such as the personal computer can supply current. Upon completion of the USB initial communication, the USB block 217 forwards the information on whether the external device can supply current, which is obtained through the USB initial communication, to the camera control section 218 (S260).

Upon reception of the information on whether the external device can supply current, from the USB block 217, the camera control section 218 turns the USB block 217 off (S270). When the USB block 217 is turned off, the camera control section 218 determines, based on the information received from the USB block 217, whether a current having a predetermined magnitude (e.g., 500 mA) can be supplied from the connected external device (S280). If the camera control section 218 determines that a current having a predetermined value or more can be supplied from the external device (Yes in S280), the control by the camera control section 218 proceeds to S290, and otherwise, the control proceeds to S350.

If Yes in S280, that is, if it is determined that a current having a predetermined value or more can be supplied from the external device, the camera control section 218 performs USB charge setting (S290). Specifically, the camera control section 218 writes, in the control register 212 in the power feeding control section 211, information indicating that battery charge can be possible via the USB connection section 290. Upon completion of the USB charge setting, the camera control section 218 automatically turns off (S300). When the camera control section 218 turns off, the power feeding control section 211 restarts battery charge by means of the AC power source via the AC connection section 300 (S310). After restart of the battery charge by means of the AC power source, the power feeding control section 211 monitors whether current is supplied from the AC connection section 300 (S320). While current is supplied from the AC connection section 300 (Yes in S320), the power feeding control section 211 continues charging from the AC power source via the AC connection section 300 (S330). In the other cases (No in S320), the power feeding control section 211 starts charging using the power from the external device via the USB connection section 290 (S340).

On the other hand, if No in S280, that is, if it is determined that a current having a predetermined value or more cannot be supplied from the external device, the camera control section 218 automatically turns off (S350). When the camera control section 218 turns off, the power feeding control section 211 restarts battery charge by means of the AC power source via the AC connection section 300 (S360). After restart of the battery charge by means of the AC power source, the power feeding control section 211 monitors whether current is supplied from the AC connection section 300 (S370). While current is supplied from the AC connection section 300 (Yes in S370), the power feeding control section 211 continues charging from the AC power source via the AC connection section 300 (S380). In the other cases (No in S370), the power feeding control section 211 indicates a charge error (S390). This charge error can be indicated by blinking a power supply LED (not shown) provided in the digital video camera 100 so as to inform the user that the battery cannot be charged via the USB connection section 290.

The power feeding control section 211 according to this embodiment determines whether current can be supplied from an external device when the USB connection section 290 is connected to the external device. Then the power feeding control section 211 performs the USB charge setting when current can be supplied. With this USB charge setting performed in advance, the power feeding control section 211 can promptly start battery charge via the USB connection section 300, in the case where current from the AC power source is discontinued, for example, due to removal of the AC adapter.

In addition, when an external device is connected to the USB connection section 300, the power feeding control section 211 will not turn the whole control section 210 on, but turn on the camera control section 218 and a part of the device control section 216 (USB block 217). That is, the power feeding control section 211 turns on blocks in the control section 210 which are necessary for performing processes in S280 and S290, and turns off the blocks when they becomes unnecessary to be kept on. Accordingly, it is possible to reduce the power consumption during battery charge as much as possible.

When current from an external device is smaller than a predetermined magnitude, and in addition, when current cannot be supplied from the AC connection section 300, either, the power feeding control section 211 will not charge the battery 310. The reason for this will be described below.

Upon charging the battery 310, the power supply LED (not shown) starts blinking to notify the user of being under charge/charge completion. Since blinking of the power supply LED also consumes power, if the battery 310 is charged by using a small current, it takes a long period of time to complete charging the battery 310. Further, if the current is to be fed for charging is very small, charging may not be performed. In addition, if charging is to be performed regardless of the magnitude of the current to be fed, the user cannot anticipate when charging of the battery 310 completes even if the user recognizes when the power supply LED starts blinking. Therefore, in order to shorten the time required for charging the battery 310 thereby to spare the user inconvenience, it is set such that in the case where the current fed from an external device is smaller than a predetermined magnitude and no connection is established with the AC power source, the power feeding control section 211 will not perform charging the battery 310 by means of the external device.

Further, if the digital video camera 100 is connected to both the AC power source and external device, the power feeding control section 211 will charge the battery 310 by means of the AC power source. This is because a larger current can be fed from the AC power source. Charging the battery 310 by means of the AC power source allows the power feeding control section 211 to complete charging in a shorter period of time as compared to charging the battery 310 via the external device connection section 290.

Figure 5:
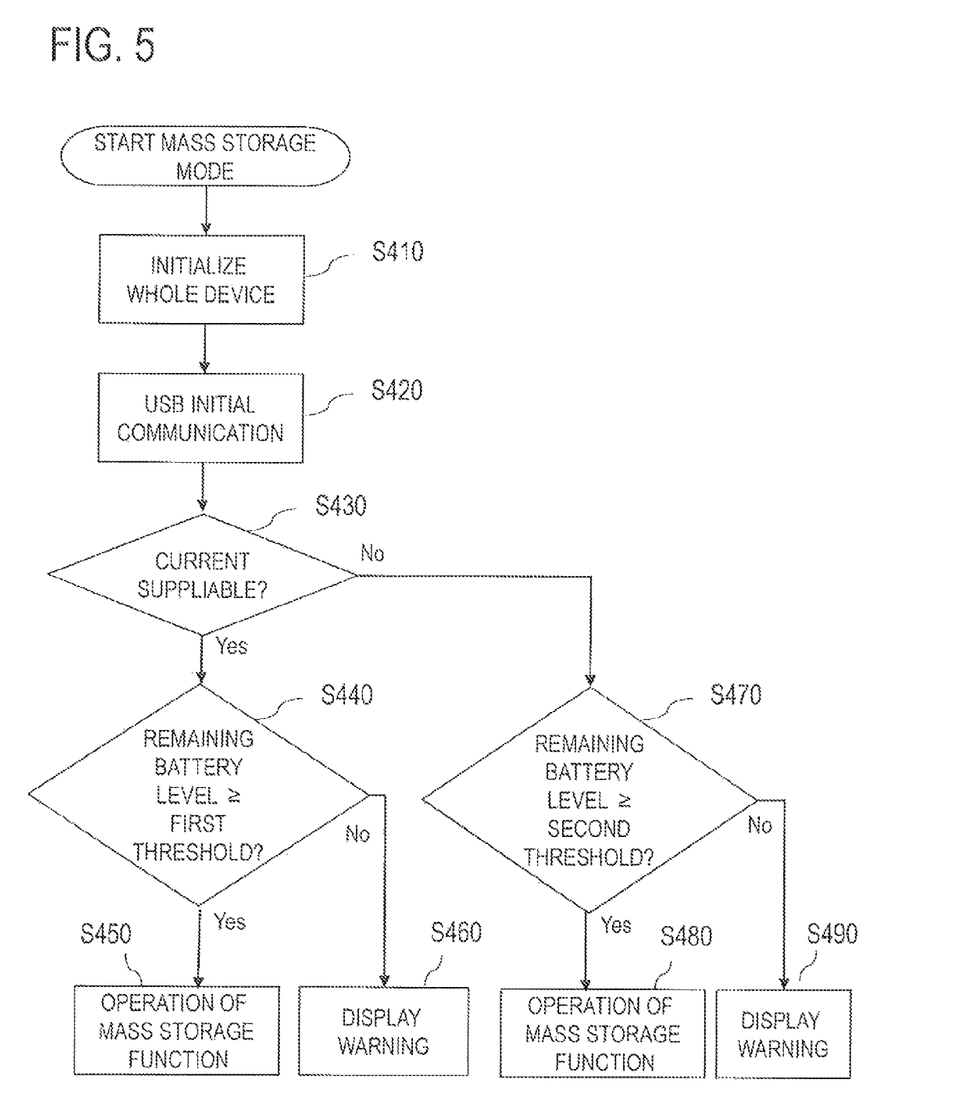
FIG. 5 is a flowchart showing a control process performed in a Mass Storage mode.

FIG. 5 is a flowchart showing a control process performed in a Mass Storage mode.

In the Mass Storage mode (S130 in FIG. 3), the device control section 216 performs initialization of the whole device (S410). Upon completion of the initialization of the whole device, the USB block 217 in the device control section 216 starts the USB initial communication with the external device via the USB connection section 290 (S420). Specifically, the USB block 217 notifies the external device such as a personal computer of the functions or features of the whole device, or checks whether current can be supplied from the external device such as a personal computer.

Upon completion of the USB initial communication, the device control section 216 determines, based on the information obtained during the USB initial communication, whether a current having a predetermined magnitude (e.g., 500 mA) can be fed from the connected external device (S430). If the device control section 216 determines that a current having a predetermined value or more can be fed from the external device, (Yes in S430), the control of the device control section 216 proceeds to S440. In the other cases, the control proceeds to S470.

If Yes in S430, that is, if it is determined that a current having the predetermined value or more can be fed from the external device, the device control section 216 determines whether the remaining level of the battery 310, which has been obtained via the camera control section 218 and power feeding control section 211, is equal to or higher than a first threshold (S440). The first threshold corresponds to, for example, 10% of the total battery capacity. If the device control section 216 determines that the remaining level of the battery 310 is equal to or higher than the first threshold (Yes in S440), the device control section 216 continues communication with the external device via the USB connection section 290, thereby starting operation of the Mass Storage function (S450). In the other cases (No in S440), the device control section 216 displays on the LCD monitor 270 a warning indicating that "Mass Storage function cannot be operated due to shortage of the remaining battery level" (S460). Further, in S460, the device control section 216 discontinues communication with the external device via the USB connection section 290, and will not operate the Mass Storage function. In S450 and S460, the digital video camera 100 operates using a current fed from the external device via the USB connection section 290.

On the other hand, if No in S430, that is, if it is determined that a current having a predetermined magnitude or more cannot be fed from the external device, the device control section 216 determines whether the remaining level of the battery 310, which has been obtained via the camera control section 218 and power feeding control section 211, is equal to or higher than a second threshold (here, second threshold>first threshold) (S470). The second threshold corresponds to, for example, 20% of the total battery capacity. If the device control section 216 determines that the remaining level of the battery 310 is equal to or higher than the second threshold (Yes in S470), the device control section 216 continues communication with the external device via the USB connection section 290, thereby starting operation of the Mass Storage function (S480). In the other cases (No in S470), the device control section 216 displays on the LCD monitor 270 a warning indicating that "Mass Storage function cannot be operated due to shortage of the remaining battery level" (S490). Further, in S490, the device control section 216 discontinues communication with the external device via the USB connection section 290, and will not operate the Mass Storage function. In S480 and S490, the digital video camera 100 operates using the battery 310 without current fed from the external device via the external device connection section 290.

The digital video camera 100 according to this embodiment changes, depending on the magnitude of the current to be fed from an external device, the remaining level of the battery 310 required for operation of the Mass Storage function. Specifically, if current can be fed from the external device, the Mass Storage function is operated even if the remaining battery level is reduced to a predetermined level (first threshold<remaining battery level<second threshold), whereas if current cannot be fed from the external device, the Mass Storage function is operated only in the case where the remaining battery level is sufficient (remaining battery level>second threshold). As a result, the digital video camera 100 can operate the Mass Storage function as much as possible by using the current fed from the external device even when the remaining battery level is low. Further, it is possible to prevent the battery 310 from running out while the digital video camera 100 transmits/receives data to/from the external device.

The description of this embodiment has been made as above. However, the present invention is not limited to the above description. First of all, the optical system and drive system of the digital video camera 100 according to this embodiment is not limited to those shown in FIG. 1. For example, although the optical system illustrated in FIG. 1 is composed of three lens units, the lens configuration may be two lens units, four lens units, or the like. Further, each lens unit may be composed of a lens, or may be composed of a plurality of lenses.

Further, although the CCD image sensor 160 has been illustrated as the image sensor, the present invention is not limited thereto. For example, the image sensor may be configured with a Complementary Metal Oxide Semiconductor (CMOS) image sensor, or with a negative channel Metal Oxide Semiconductor (NMOS) image sensor. Alternatively, the image sensor may be configured with a 3CCD, or a 3MOS image sensor.

Further, in this embodiment, the magnitude of current of 500 mA is used as the criteria for determining whether the battery 310 is to be charged from the external device, but the present invention is not limited thereto. For example, the magnitude of the current may be 100 mA or 200 mA. In other words, any magnitude of current may be employed as long as the current is sufficient to activate the internal components of the digital video camera 100 that are necessary for charging.

Further, in this embodiment, the threshold used for determining whether current can be fed from the external device in the charging mode is the same as the threshold used for determining whether current can be fed from the external device in the Mass Storage mode. However, the thresholds may be set different from each other.

Further, in this embodiment, the first threshold and second threshold used in the Mass Storage mode (FIG. 5) are 10% and 20%, respectively. However, the present invention is not limited to these. The thresholds may be set arbitrarily as long as the first threshold is lower than the second threshold.

In this embodiment, only the camera control section 218 and USB block 217 are turned on in the charging mode (S230 and S240 in FIG. 4A). However, the camera control section 218 and the whole of the device control section 216 may be turned on.

In this embodiment, the USB connection section 290 has been illustrated as an interface for connection with the external device. However, any interface of another specification can be employed in place of the USB connection section 290, as long as the interface is intercommunicable with an external device and can receive current fed from the external device. For example, an IEEE1394 terminal may be used.

Further, in this embodiment, the present invention is applied to a digital video camera. However, the present invention is not limited thereto. The present invention is applicable to, for example, a digital still camera, a mobile phone, a personal computer, a portable music player, and the like.

The present invention is applicable to electronic devices such as a digital video camera and a digital still camera.

What is claimed is:

1. A rechargeable device selectively suppliable with operating power from an AC power source and from a power-supplying capable external electronic device, the rechargeable device simultaneously connectable to both the AC power source and the external electronic device, and comprising:
   a battery;
   a first connector connectable to the AC power source;
   a second connector intercommunicably connectable to the external electronic device, for being fed with current from the external electronic device, wherein the second connector is different from the first connector; and
   a controller for charging the battery by the AC power source while current is being supplied from the AC power source to the first connector, and for charging the battery using power from the external electronic device when current is not being supplied from the AC power source to the first connector and a predetermined level of current is suppliable from the external electronic device to the second connector, the controller therein being configured to start performing charge-setting directed initial communication with the external electronic device when the second connector becomes connected to the external electronic device while the first connector is connected to the AC power source and the battery is being charged by the AC power source.

2. The rechargeable device according to claim 1, wherein the controller is further configured so as, upon performing the charge-setting directed initial communication with the external electronic device, to determine whether current of at least a predetermined value can be supplied to the second connector from the external electronic device, and if the predetermined value of current can be supplied to the second connector, to perform a charge-setting routine necessary to enable the battery to be charged from the external electronic device.

3. The rechargeable device according to claim 2, wherein the controller is further configured so as, when the second connector becomes connected to the external electronic device while the battery is being charged by the AC power source, to discontinue charging the battery by the AC power source, and to restart charging of the battery by the AC power source when said charge-setting routine finishes.

4. The rechargeable device according to claim 2, wherein:
the controller comprises a control block for performing the controller's initial communication with the external electronic device when the second connector becomes connected to the external electronic device, and for performing, as conditioned by the initial communication, the charge-setting routine; and
the controller is further configured
   to power on the control block, and thereby execute the charge-setting routine, if the second connector becomes connected to the external electronic device while the battery is being charged by the AC power source, and
   to power off the control block upon execution of the charge-setting routine by the control block having been powered on.

* * * * *